(12) United States Patent
Taylor et al.

(10) Patent No.: US 12,209,451 B2
(45) Date of Patent: Jan. 28, 2025

(54) SYSTEMS AND METHODS FOR TRANSFERRING A LOCKED CONTAINER BETWEEN VAULTS

(71) Applicant: Tidel Engineering, L.P., Carrollton, TX (US)

(72) Inventors: Darren Taylor, Carrollton, TX (US); Steven Remis, Carrollton, TX (US); Doug Powers, Carrollton, TX (US); Todd Dillen, Carrollton, TX (US)

(73) Assignee: Tidel Engineering, L.P., Carrollton, TX (US)

( * ) Notice: Subject to any disclaimer, the term of this patent is extended or adjusted under 35 U.S.C. 154(b) by 171 days.

(21) Appl. No.: 18/103,157

(22) Filed: Jan. 30, 2023

(65) Prior Publication Data
US 2023/0175309 A1    Jun. 8, 2023

Related U.S. Application Data

(63) Continuation of application No. PCT/US2021/043290, filed on Jul. 27, 2021.

(60) Provisional application No. 63/057,550, filed on Jul. 28, 2020.

(51) Int. Cl.
*E05G 7/00* (2006.01)
*G06F 21/31* (2013.01)
*G07C 9/00* (2020.01)

(52) U.S. Cl.
CPC ............ *E05G 7/001* (2013.01); *G06F 21/31* (2013.01); *G07C 9/00309* (2013.01)

(58) Field of Classification Search
CPC .......... E05G 7/00; E05G 7/001; G06F 21/31; G07C 9/00; G07C 9/00309; G07D 11/00; G07D 11/12; G07D 11/125; G07F 17/00

USPC .......................................................... 109/23
See application file for complete search history.

(56) References Cited

U.S. PATENT DOCUMENTS

| | | | |
|---|---|---|---|
| 6,885,281 B2 * | 4/2005 | McGunn | E05F 15/77 340/5.5 |
| 7,428,985 B1 | 9/2008 | Moreland et al. | |
| 9,000,916 B2 * | 4/2015 | Meeker | G07F 19/209 235/375 |

(Continued)

FOREIGN PATENT DOCUMENTS

WO    WO-2006125796 A1 * 11/2006 ......... G07D 11/0006

OTHER PUBLICATIONS

Examination report No. 1 for Australian Application No. 2021318956 dated Dec. 5, 2023 (2 pages).

*Primary Examiner* — Suzanne L Barrett
(74) *Attorney, Agent, or Firm* — Polsinelli PC

(57) ABSTRACT

Implementations described and claimed herein provide systems and methods for securely transferring a locked container from a primary vault to a secondary vault. In one implementation, a triggering event corresponding to a transfer of a first locked container from the primary vault to the secondary vault is detected. The first locked container is detected in the primary vault, and a second locked container is detected in the secondary vault. A transfer time for the transfer is determined based on when the second locked container is detected in the secondary vault. The transfer is validated as a compliant transfer when the second locked container is identified as the first locked container and the transfer time is within a time tolerance band.

29 Claims, 7 Drawing Sheets

(56) References Cited

U.S. PATENT DOCUMENTS

| | | | | |
|---|---|---|---|---|
| 9,041,811 | B2* | 5/2015 | Kanda | G08B 13/19645 |
| | | | | 348/E7.085 |
| 9,495,705 | B2* | 11/2016 | Blachowicz | G07G 1/12 |
| 2013/0066799 | A1* | 3/2013 | Walters | G07D 11/125 |
| | | | | 206/499 |
| 2013/0240619 | A1 | 9/2013 | Brindley et al. | |
| 2015/0149352 | A1* | 5/2015 | Nichols | G06Q 20/10 |
| | | | | 705/40 |
| 2018/0251301 | A1* | 9/2018 | Wolf | H04W 72/51 |

* cited by examiner

SYSTEMS AND METHODS FOR TRANSFERRING A LOCKED CONTAINER BETWEEN VAULTS

CROSS-REFERENCE TO RELATED APPLICATIONS

The present application is a continuation of and claims priority to International Patent Application No. PCT/US2021/043290 filed Jul. 27, 2021, entitled "Systems and Methods for Transferring a Locked Container between Vaults, which claims priority to U.S. Provisional Patent Application No. 63/057,550, entitled "Systems and Methods for Transferring a Locked Container between Vaults" and filed on Jul. 28, 2020. Each of these applications is incorporated by reference in its entirety herein.

TECHNICAL FIELD

Aspects of the present disclosure relate to systems and method for securely transferring locked containers between vaults and more particularly to validating a compliance of a transfer of a locked container from a sealing vault to a storage vault, such that any provisional credit awarded to a site based on the locked container may be maintained following the transfer.

BACKGROUND

Managing and securing funds is important to many individuals and organizations, such as retailers, dining locations (e.g., a bar or a restaurant), department stores, casinos, grocers, financial institutions, money services, government offices, businesses, and/or the like. When secured, the funds are locked within a container, for example disposed within a sealed container. A courier regularly conducts pickups of such locked containers for deposit at a financial institution. Once counted, the organization is credited for the value of the funds. In some cases, an organization deploys a system for validating the funds that are securely stored by counting the funds as they are deposited into the locked container. Such a system may be used to award provisional credit to the organization for the value of the funds in the locked container until the funds are picked up and counted. However, once the locked container is full, additional funds cannot be added to it, such that the organization is unable to obtain provisional credit for funds unless a special courier pickup is conducted to obtain the full container. Special courier pickups are often costly, where the organization is left with choosing between the expense of a special courier pickup or forgoing provisional credit for additional funds until after the regular courier pickup. It is with these observations in mind, among others, that various aspects of the present disclosure were conceived and developed.

SUMMARY

Implementations described and claimed herein address the foregoing problems by providing systems and methods for till management. In one implementation, a triggering event corresponding to a transfer of the locked container from the primary vault to the secondary vault is detected. A set of initial physical characteristics of the locked container in connection with a first volume of the primary vault is detected. The set of initial physical characteristics is captured using a sensor system. A set of physical characteristics of the locked container in connection with a second volume of the secondary vault is detected. The set of physical characteristics is captured using the sensor system. A set of transfer characteristics associated with a timing of the transfer from the primary vault to the secondary vault is detected, and a compliance of the transfer is determined based on the set of transfer characteristics and a comparison of the set of physical characteristics with the initial physical characteristics.

In another implementation, a first physical value of a locked container when the locked container is associated with a first volume of a first vault is obtained. A first time corresponding to access to the locked container in the first volume of the first vault is obtained. A second physical value of the locked container when the locked container is associated with a second volume of a second vault is obtained, and a second time corresponding to a placement of the locked container in the second volume of the second vault is obtained. A physical difference of the locked container between the first volume and the second volume is determined based on the first physical value and the second physical value. A transfer time is determined based on the first time and the second time. A physical compliance of a transfer of the locked container from the first vault to the second vault is determined based on the physical difference, and a time compliance of the transfer of the locked container from the first vault to the second vault is determined based on the transfer time. A determination of whether the transfer of the locked container from the first vault to the second vault was a compliant transfer is based on the physical compliance and the time compliance.

In yet another implementation, a triggering event corresponding to a transfer of the locked container from the primary vault to the secondary vault is detected. An available space for the locked container in a storage volume of the secondary vault is detected. A first door on the primary vault is triggered to unlock, and a second door on the secondary vault is triggered to unlock. The locked container is detected in the storage volume in the secondary vault following the transfer. The second door on the secondary vault is triggered to lock following the transfer of the locked container from the primary vault to the secondary vault.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure involve systems and methods for securely transferring a locked container from a primary vault to a secondary vault. In one aspect, a triggering event corresponding to a transfer of a first locked container from the primary vault to the secondary vault is detected. The first locked container is detected in the primary vault, and a second locked container is detected in the secondary vault. A transfer time for the transfer is determined based on when the second locked container is detected in the secondary vault. The transfer is validated as a compliant transfer when the second locked container is identified as the first locked container and the transfer time is within a time tolerance band. Based on the compliant transfer, provisional credit for the funds secured within the locked container.

The presently disclosed technology thus permits an organization to maintain or receive an award of provisional credit for funds securely held in a locked container following transfer of the locked container from a primary vault to a secondary vault. As such, the organization can continue to deposit and validate funds using the primary vault to receive provisional credit for such additional funds in between regularly scheduled courier visits. Thus, the frequency of courier visits is minimized, while maximizing the funds eligible for provisional credit. Other advantages of the presently disclosed technology will be apparent from the present disclosure.

Figure 1:
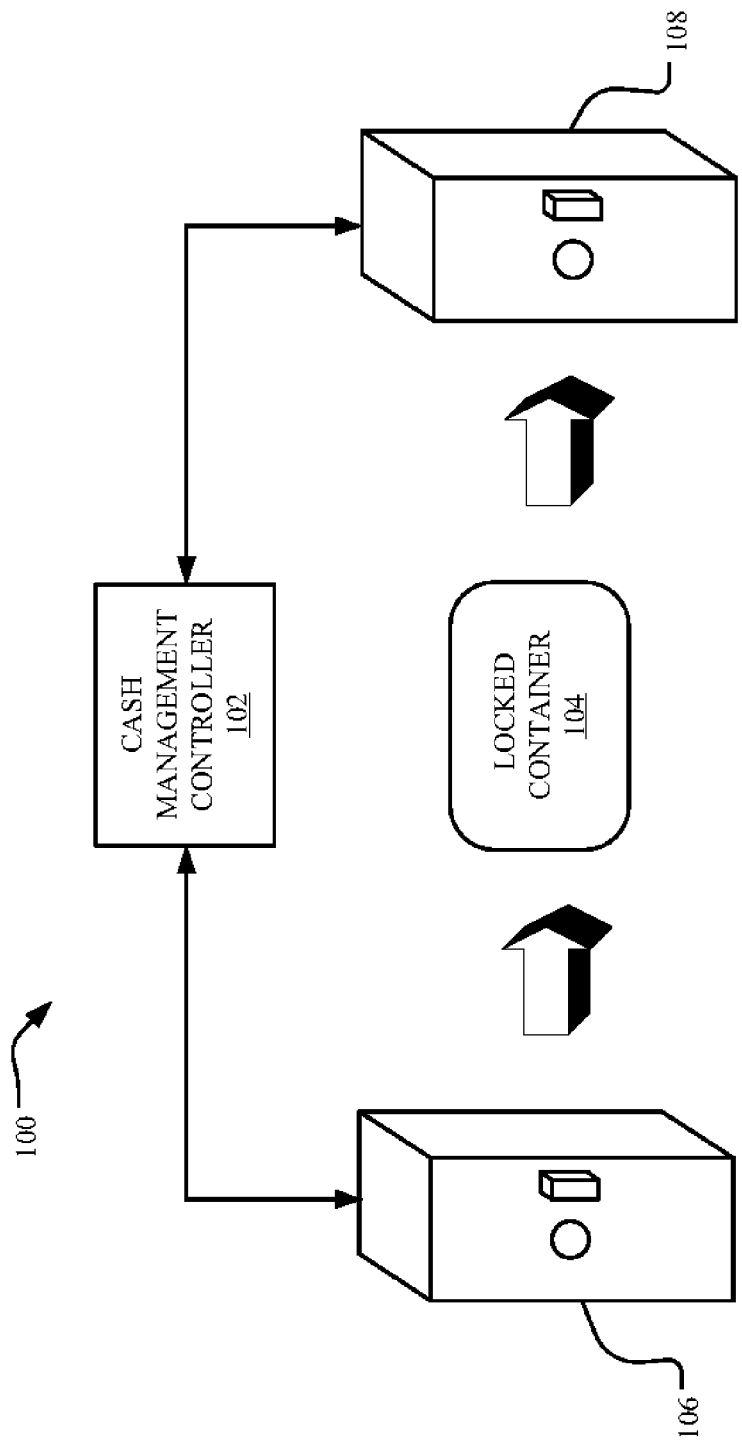
FIG. 1 illustrates an example environment for a locked container transfer.

To begin a detailed description of an example environment 100 for a locked container transfer, reference is made to FIG. 1. The environment 100 is deployed at a site of an organization, which may be, without limitation, a financial institution, a money services business, a retailer, casino, restaurant, government office, medical business, and the like. Generally, the organization manages and secures funds, which may include cash, notes, and/or the like, using a cash management controller 102, among other computing units as detailed herein.

Managing funds include various activities, including, but not limited to depositing funds, dispensing funds, making change, providing card-related services (e.g., via an Automated Teller Machine (ATM), self-check-out device, etc.), performing cash room activities, making tills, checking in tills, obtaining or paying for loans, receiving payments, crediting for change (e.g., via a coin kiosk), checking out customers, bank teller operations, rolling coins, and/or the like.

Securing funds includes inserting validated or non-validated funds in a locked container 104. The locked container 104 may be or otherwise be part of, without limitation, a sealed container that is sealed by a sealing vault, a smart safe vault, an ATM, a cash recycler, a cassette, a sealed bag, a "dumb safe," a cash room drawer, a filing cabinet, a lock box, a deposit vault, a drop vault, a locked register, and/or other secured volumes. While the present disclosure references a locked container 104, it will be appreciated that the locked container 104 may involve one or more locked containers.

The securing of cash is non-validated if the amount of money entering a secured area of a primary vault is not confirmed. On the other hand, the funds are validated when the funds that are inserted into the secured area of a primary vault 106 are counted or otherwise confirmed as they enter a secured area of the primary vault 106. Funds for deposit and courier pickup may be placed into the locked container 104. More particularly, funds may be loose, stacked, rolled, wrapped, or otherwise organized within the primary vault 106, and funds placed inside the locked container 104 may be stacked, semi-stacked, or loose.

The primary vault 106 may be part of a smart safe, a cash recycler, or similar device. For example, the primary vault 106 may be associated with a validator head integrated with a smart safe that identifies and validates funds presented to the smart safe. Data associated with the deposited funds secured within the smart safe is stored by the smart safe, and the funds are secured within the primary vault 106. In another example, the primary vault 106 may be associated with a cash recycler in which note currency is refunded and deposited in various vaults, and coin currency is deposited and dispensed in a coin subsystem.

In one implementation, the primary vault 106 is a secure vault, with validated funds being stored in the locked container 104 in the primary vault 106 for pickup by a courier for deposit at a financial institution. As described herein, a cash-in-transit operator associated with the courier may charge a service fee to the organization for picking up deposited funds (either validated or non-validated), and directly or indirectly provide credit for the picked up funds to the organization account. The courier visit may be on a scheduled basis, on request, and/or when the locked container 104 is at a capacity threshold (e.g., filled to near capacity, filled to capacity, or filled to another designated level). Typically, weekly or biweekly pickups are scheduled, although other arrangements are also common. If the organization needs an additional pickup by the courier outside the regularly scheduled visits, it is common for the cash-in-transit operator to charge extra to pick up the funds during an unscheduled visit.

As such, provisional credit for validated funds deposited into the primary vault 106 may be awarded to an account of the organization by the financial organization or a cash-in-transit operator associated with the courier. More particularly, the award of provisional credit may occur while the funds are still inside the primary vault 106, well before the funds are picked up by the courier for deposit into the organization account. There are many benefits associated with the organization having the funds available in the organization account while the funds are physically in the primary vault 106 or being processed by the cash-in-transit operator or the financial institution. Such benefits to the organization include, but are not limited to, improved accuracy of counting funds, reduced time and resources expended in managing funds, and increased security by not having to take the deposited funds to the bank directly.

However, if the primary vault 106 reaches capacity, such that is has no capacity for receiving additional funds, the organization is unable to obtain provisional credit for additional funds that are stored at the organization site unless it schedules a special courier visit or delivers the funds itself. This is due, at least in part, to the fact that if the funds are accessed to make room for additional funds, the validity of the basis of the provisional credit becomes questionable. In an ideal situation, the courier would arrive as soon as the primary vault 106 reaches capacity, such that the organization does not have to incur costs associated with a special courier visit or lose the ability to obtain provisional credit for additional funds. However, with the amount of funds being deposited into the primary vault 106 varying, often significantly, from day to day, the point at which the primary vault 106 reaches capacity is generally unpredictable for matching to regularly scheduled courier visits.

Thus, in one implementation, the cash management controller 102 executes a transfer of the locked container 104 from the primary vault 106 to a secondary vault 108, which may be selected from a plurality of secondary vaults 108. The primary vault 106 and/or the secondary vault 108 may each be sealing vaults, storage vaults, and/or the like. Where the transfer is validated as a compliant transfer of the locked container 104 from the primary vault 106 to the secondary vault 108, provisional credit for the funds in the locked container 104 may be maintained or awarded following transfer to the secondary vault 108. Thus, the organization is able to receive provisional credit for funds moved to a secondary vault 108 in a compliant transfer between courier visits.

In addition to the transfer of the locked container 104 from the primary vault 106 to the secondary vault 108 occurring when the locked container 104 reaches the capacity threshold, the transfer may occur in other circumstances where the organization would benefit from transferring the locked container 104 to the secondary vault 108. For example, other scenarios where the organization may benefit from transferring the locked container 104 include when the primary vault 106 is scheduled for or otherwise undergoing maintenance.

Generally, the physical characteristics of the locked container 104 and a timing of the transfer between the primary vault 106 and secondary vault 108 are analyzed to determine whether there was any tampering with the locked container 104 or other nefarious activity that would invalidate or otherwise challenge the validity of the provisional credit for the funds in the locked container 104. More particularly, in one implementation, an authorized user may initiate a transfer of the locked container 104, which triggers the primary vault 106 and the second vault 108 to open either together (e.g., at or close to the same time), sequentially, and/or upon a manual command. Once the door to the primary vault 106 is unlocked, times associated with various actions or with the capture of different sensor data are recorded. Physical characteristics of the locked container 104, including, but not limited to, weight, mass, size, shape, color, identification (e.g., serial code, barcode, Radio Frequency Identification (RFID) chip, 3D barcode, an identification chip (e.g., iButton), Near Field Communication (NFC) chip, electronic asset tag, etc.) and/or the like, may be recorded at various times in connection with the transfer from the primary vault 106 to the secondary vault 108. Additionally, characteristics of the transfer itself, such as an unlocking of the primary vault 106, an unlocking of the secondary vault 108, a removal of the locked container 104 from the primary vault 108, a placement of the locked container 104 in the secondary vault 108, a locking of the primary vault 106, a locking of the secondary vault 108, and/or other actions, may be recorded in association with a corresponding timestamp.

Using the physical characteristics recorded at various times in connection with the transfer, the cash management controller 102 confirms the locked container 104 located in the secondary vault 108 is the same as the locked container 104 that was previously located in the primary vault 106. In some implementations, alternative to or in addition to the recorded physical characteristics and transfer characteristics, input characteristics, such as manual data input by an authorized user confirming the locked container 104 was moved, may be used to confirm and validate the transfer. Stated differently, an authorized user may confirm the transfer via direct or indirect input captured by interface(s) or sensor(s) of the primary vault 106 and/or secondary vault 108. By comparing the physical characteristics, the transfer characteristics, and/or the input characteristics, as well as the corresponding timestamps, with tolerance bands, the cash management controller 102 determines whether the transfer of the locked container 104 from the primary vault 106 to the secondary vault 108 was a compliant transfer, and if so, what level of compliance the compliant transfer met. Based on the level of compliance, provisional credit for the funds within the locked container 104 may be maintained or otherwise awarded.

Additionally, a report of the transfer may be generated that identifies the user conducting the transfer and that documents or summarizes the physical characteristics, the transfer characteristics, the corresponding timestamps, the comparison to the tolerance bands, whether the transfer was compliant, the level of compliance, and/or the like. As an example, the report may specify that a particular user was logged in during a transfer, the locked container 104 was removed at time $t_1$ from the primary vault 106, the locked container 104 was positioned in the secondary vault 108 at time $t_2$, the total transfer time was $t_T$ (total time elapsed from $t_1$ to $t_2$), the total transfer time was within a time tolerance band, the bar code of the locked container 104 when located within the primary vault 106 matches the bar code of the locked container 104 located in the secondary vault 108 following the transfer, the locked container 104 had a weight $w_1$ when located in the primary vault 106, the locked container 104 had a weight $w_2$ following the transfer to the secondary vault 108, and a weight difference between $w_1$ and $w_2$ was within a weight tolerance band. Further, values of other physical characteristics of the locked container 104 may be measured and compared to other physical tolerance bands, which may additionally be included on the transfer report. Based on the total transfer time being within the time tolerance band, matching bar codes, and the weight difference being within the weight tolerance band, the report would indicate that the transfer was a compliant transfer.

Generally, the cash management controller 102 obtains measurements of physical characteristics of the locked container 104 and transfer characteristics of the process by which the locked container 104 is moved from the primary vault 106 to the secondary vault 108 and secured therein. Based on this information, the cash management controller 102 determines whether the transfer was compliant and if so, a level of compliance is determined. The level of compliance may be used as a basis for maintaining or awarding provisional credit for the funds in the locked container 104. Following the transfer of the locked container 104 to the secondary vault 106, an empty container may be placed in the primary vault 106 to receive additional funds. Locked containers may be transferred to the secondary vault 106 to create free space for empty containers to receive additional funds, which may be similarly awarded provisional credit, until the next regularly scheduled courier visit.

Figure 2:
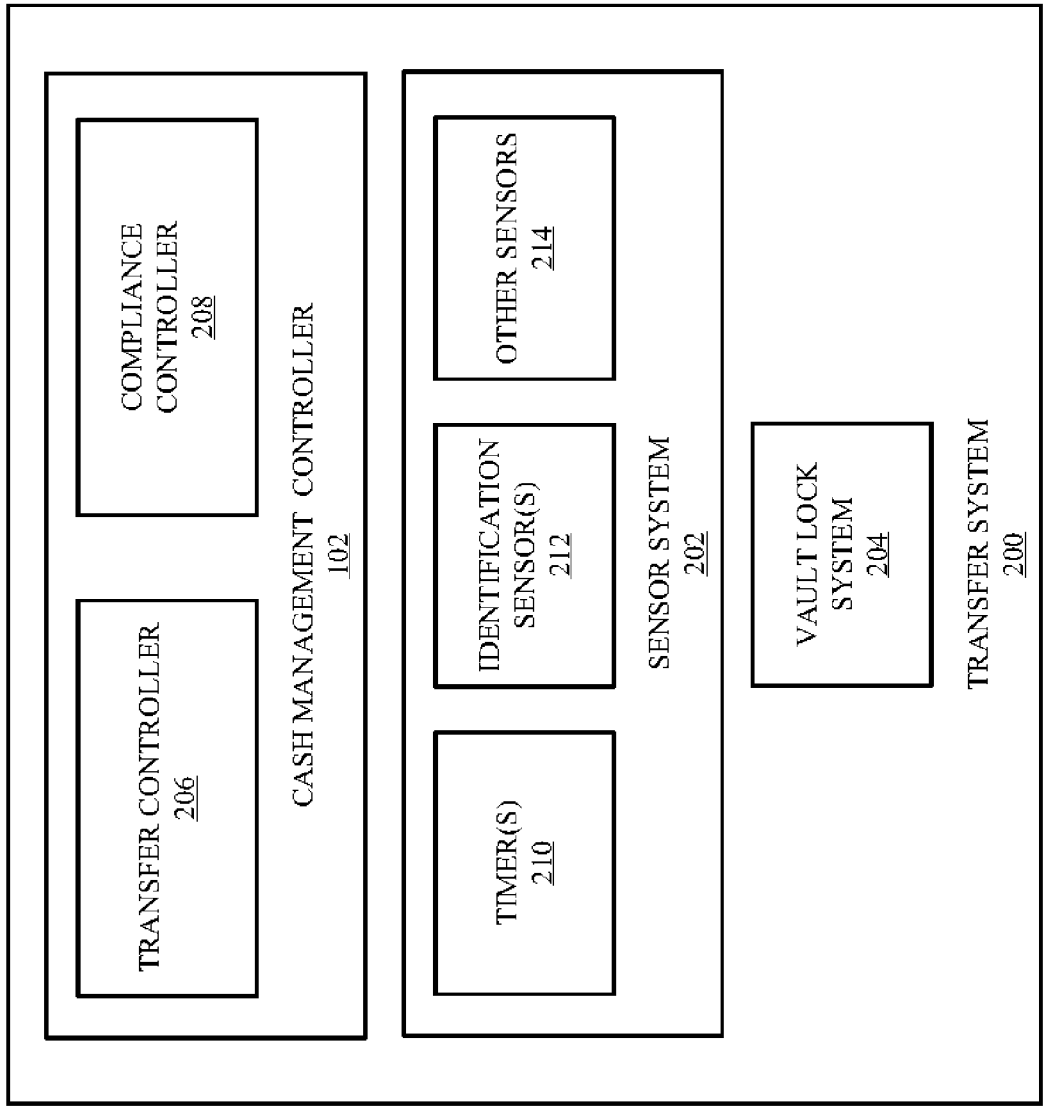
FIG. 2 is a block diagram of an example transfer system for locked container transfer.

For a detailed description of an example transfer system 200 that may be deployed in the environment 100, reference is made to FIGS. 1-2. The transfer system 200 includes the cash management controller 102, a sensor system 202, and a vault lock system 204, among other systems and components.

In one implementation, the cash management controller 102 includes a transfer controller 206 for controlling a transfer of the locked container 104, a compliance controller 108 controlling a validation of a compliance of the transfer, and/or other sub-controllers. The cash management controller 102, as well as the corresponding sub-controllers, may be remote from or integrated with one or more of the vaults 106-18. For example, the cash management controller 102 may include a cash management controller integrated with the primary vault 106 that is in communication with a cash management controller integrated with the secondary vault 108. The cash management controller 102 may be integrated with the primary vault 106 with a controller of the secondary vault 108 being in communication with the cash management controller 102 of the primary vault 106 to control various mechanisms and operations of the secondary vault 108 or vice versa. In another example, the cash management controller 102 may be a remote computing device in communication with controllers of the vault 106-108. The remote computing device may be deployed at the organization site with the vaults 106-108 or in a remote location in communication with the vaults 106-108 over a network, as described herein. The various communications in connection with the cash management controller 102 may be via wired or wireless connections. Additionally, distributed or non-distributed nonvolatile or other memory may be deployed in or separate from the vaults 106-108 for utilization by the cash management controller 102 to record device history, transfer reports, calibration, sensor data, and/or other data. It will be appreciated that other configurations of the cash management controller 102, the sub-controllers (e.g., the transfer controller 206 and the compliance controller 208) and related components are contemplated.

The sensor system 202 may include one or more sensors deployed in or otherwise in association with the vaults 106-108. For example, the sensor system 202 may include one or more primary vault sensors associated with the primary vault 106, one or more secondary vault sensors associated with the secondary vault 108 (as well as other secondary vaults when a plurality of secondary vaults are utilized), and one or more site sensors associated with a room and/or facility housing the vaults 106-108. In one implementation, the sensor system 202 includes one or more timers 210, one or more identification sensors 212, and/or one or more other sensors 214 that may be deployed or otherwise integrated in various systems and components. Each of these sensors 210-214 may include local memory for storing sensor data and/or local computing units for processing the same.

The one or more timers 210 are configured to record a timing of different aspects of the transfer process, including timestamps associated with sensor data captured by the identification sensors 212 and/or the other sensors 214. For example, the timer(s) 210 may record a timing of various transfer activities, such as: inputting data via a user interface associated with the cash management controller 102; authorizing a user in connection with a transfer of the locked container 104; identifying the locked container 104 in the primary vault 106; unlocking the primary vault 106; unlocking the secondary vault 108; opening the primary vault 106; opening the secondary vault 108; removing the locked container 104 from the primary vault 106; receiving the locked container 104 in the secondary vault 108; identifying the locked container 104 in the secondary vault 108; closing the secondary vault 108; placing a new container in the primary vault 106; identifying the new container in the primary vault; closing the primary vault 106, locking the secondary vault 108, locking the primary vault 106, and/or the like. The timing of when various physical characteristics of the locked container 104 were recorded by the identification sensor(s) and/or the other sensors 214 may be similarly recorded using the timer(s) 210.

Various physical characteristics of the locked container 104 may be sensed using the identification sensor(s) 212 and/or the other sensors 214 while the locked container 104 is within or being removed from the primary vault 106. The physical characteristics may include an identification of the locked container 104, as well as weight, mass, dimensions, size, shape, color, and/or the like. Thus, when the locked container 104 is transferred into the secondary vault 108, the physical characteristics may be captured again using the identification sensor(s) 212 and/or the other sensors 214 to confirm that the locked container 104 is the same as the one that was previously secured in the primary vault 106 and it is unlikely to have been tampered with. The other sensors 214 may include, without limitation, scales (e.g., a weight scale, hanging fish scale, etc.), weight or mass sensors, cameras, imagers, and/or the like. Many scales are sensitive to determine weight down to an individual note level. As such, the vaults 106-108 may include vault shields to protect the scales from external disturbances, such as wind, thereby increasing accuracy of the weighing. In some instances, the other sensors 214 that are remote from the vaults 106-108 may include a camera system that the cash management controller 102 communicates with to record images or video when a security threshold is triggered, as described herein, or otherwise in connection with transfer activities.

Further, in one implementation, removing the locked container 104 from the primary vault 106 or the secondary vault 108 or otherwise accessing the locked container 104 automatically triggers a camera system that is remote from the vaults 106-108 and/or one or more cameras associated with the vaults 106-108 to initiate video capture. The captured video may be streamed in real time or subsequent to the activity and/or recorded. Using the captured video, a transfer or other activity may be validated manually or automatically for provisional credit. Additionally, to ensure that captured video is untampered and original, such that a user is not recycling old video or tampering with the video to hide nefarious actions, a video identification pattern (such as a code, an image, a barcode, a text or number string, and/or the like) may be displayed in view of the camera for capture in the video. A corresponding identification pattern is associated with the transfer by the cash management controller 102. The video identification pattern captured in the video of the transfer is compared with the corresponding identification pattern associated with the transfer. Based on a match between the video identification pattern and the corresponding identification pattern, the video is confirmed as authentic. Based on the authentication of the video, the transfer may be validated for provisional credit.

In some cases, a remote or present observer may witness the transfer, in addition or alternative to reviewing sensor data capturing the physical characteristics, timing characteristics, input characteristics, and tolerance bands comparisons, to validate the transfer. In such cases, the witness may be authenticated prior to witnessing the transfer. The witness may observe the transfer in real time or at a later time following the transfer to perform the validation. Additionally, the cash management controller 102 may provide a recommendation to the witness regarding whether to validate or reject the transfer.

Similarly, in one implementation, raw or processed data captured by the sensor system 202 may be sent to a third party aggregator, for example over a network as described herein or via a wired or wireless connection, to validate a transfer. As such, it will be appreciated that information may be processed at different times, at different locations, and using different components for validating a transfer and awarding provisional credit.

To identify the locked container 104 in the primary vault 106 and the secondary vault 108, the identification sensor(s) 212 may include serial code sensor, barcode sensor, RFID sensor, 3D barcode sensor, a hologram sensor, an identification chip sensor, NFC sensor, electronic asset tag sensor, imager, and/or the like to sense an identification of the locked container 104 using passive or active sensing, which may be read-only or read/write with or without non-volatile storage. For example, the locked container 104 may include a sensor identifying the locked container 104, for example using a code, number, symbol, and/or other identifier that may be sensed with the identification sensor(s) 212. Various sensors utilizing energy emission and reflection technologies, including in the acoustic, radio, and other frequency domains, may be used to sense physical characteristics, including identification of the locked container 104.

In one implementation, in addition or alternative to sensing the identification of the locked container 104, the sensor system 202 senses physical characteristics of the locked container 104 to determine whether the locked container 104 is intact, such that it has not been breached, damaged, altered, or otherwise tampered with. For example, where the locked container 104 is a cassette, the sensor system 202 may determine whether the cassette is unopened, the seal unbroken, the externals undamaged, and/or the like. Similarly, where the locked container 104 is a bag or a box, the sensor system 202 may determine whether the bag or box is unopened and untorn. Similar analyses for various types of locked containers 104 may be performed. In one implementation, digital processing of one or more images, video frames, or indicators may be used to verify the locked container 104 is intact. For example, pattern matching, edge detection, object detection, and/or the like may be performed based on various captured images, video frames, and/or indicators with reference images, frames, and/or indicators to determine whether the locked container 104 is intact before, during, and/or after the transfer. Additionally, using similar computer vision techniques, the size of the locked container 104 may be sensed to establish the contents stored in the locked container 104 are unchanged. For example, a volume of a deformable container may be determined to establish the contents are the same at different times in connection with the transfer. Various other techniques may be used to confirm the locked container 104 is intact and the stored contents unchanged.

The identification of the locked container 104 may include various types of identification information, including, but not limited to, container information and use information. The container information may include a batch number, date made, capacity, and/or the like, and the use information may include notes contained, values contained, time installed, last moved time, last user who moved, a log of open/closed information, and/or the like.

As described herein, the cash management controller 102 may be integrated in the primary vault 106 in some implementations. The secondary vault 108 is in communication with the cash management controller 102 and/or the primary vault 106. The cash management controller 102 controls the transfer of the locked container 104 using the transfer controller 206 and the validation of the transfer using the compliance controller 208. The primary vault 106 may be a deposit system (e.g., a smart safe, a change-making machine, an ATM that accepts deposits, etc.), a dispensing system, and/or the like. The transfer controller 206 may communicate with the vault lock system 204 to control an unlocking and locking of the primary vault 106 and the secondary vault 108 in connection with a transfer. The lock system 204 may include various components integrated within and separate from the vaults 106-108.

In one implementation, the lock system 204 includes a lock for each of the primary vault 106 and the secondary vault 108 that may be triggered to lock or unlock using the transfer controller 206. The vault lock system 204 may include one or more sensors, such as capacitive, inductive, through-beam, and/or the like, to sense when a door of the primary vault 106 or a door of the secondary vault 108 is open. The transfer controller 206 of the cash management controller 102 may directly or indirectly trigger the locks of the primary vault 106 and/or the secondary vault 108. For example, the transfer controller 206 may directly control the locks by generating a signal to the locks. On the other hand, the transfer controller may indirectly control the locks by communicating with corresponding lock controllers of the vault lock system 204 for each of the vaults 106-108. Thus, in some implementations, there may be a distributed control of vault lockage of the vaults 106-108 using the vault lock system 204.

In one implementation, the cash management controller 102 detects a triggering event for a transfer of the locked container 104 from the primary vault 106. The triggering event may be based on a user request, a detection of the locked container 104 being at the capacity threshold, in anticipation of a scheduled maintenance of the primary vault 106, and/or the like. In connection with the triggering event, a user may be prompted or otherwise notified to initiate the transfer.

In connection with the transfer, a user logs in using a unique access, and the cash management controller 102 verifies an authorization of the user to conduct the transfer based on an identification of the user and a permission level of the identified user. The unique access may be in the form of a pin, electronic key, user biometrics (e.g., fingerprint, facial recognition, voice recognition, etc.), a physical device (e.g., RFID tag) and other access based on information known or otherwise associated exclusively with a particular user. All transactions completed are stored in memory, either locally or communicated over a wired or wireless connection for remote storage, in association with a user profile for the logged in user.

After a particular user submits a unique access in connection with logging in, the cash management controller 102 determines whether the user is authorized to conduct the transfer based on permission levels for the user. In some cases, secondary approval for the transfer by another user may be prompted based on the permission levels for the user. If the user does not have permission levels permitting the transfer, the transfer request is denied. Moreover, in some cases a dual-sign on may be prompted, such as in cases where the vaults 106-108 include separate controllers, for the user to login to both vaults 106-108. In other cases, one login is prompted at one vault where there is an integrated controller or the authorization of the login is communicated from the vault that received and authorized the login to the other vault. Once the permissions for the user to conduct a transfer are confirmed, an option to initiate the transfer of the locked container 104 from the primary vault 106 may be presented via a user interface or the transfer may be automatically initiated. In some cases, the user may be prompted to reauthenticate the user identity and permission levels at the secondary vault 108.

The cash management controller 102 may automatically detect an available space for the locked container 104 in the secondary vault 108, which may be identified from a plurality of secondary vaults. For example, the cash management controller 102 may track transfers to identify whether a particular secondary vault 108 has received one or more transfers, whether the primary vault 106 has vacated locked containers in connection with transfers, whether new containers were placed in the primary vault 106, and/or the like to identify a volume in the secondary vault 108 with available space. Additionally or alternatively, the sensor system 202 may utilize the various through-beam sensors, imagers, RFID readers, scales, and/or other identification sensor(s) and other sensors 214 to detect an absence of a container in a volume of the secondary vault 108, with the absence indicating available space for the locked container 104.

In one implementation, an identification of the locked container 104 is sensed by the identification sensor(s) 212 when the locked container 104 is placed in the primary vault 106. The identification of the locked container 104 may also be captured through manual input of the identification, or automatically in connection with the transfer. The identification and a time that the identification was obtained, as captured using the timer(s) 210, are recorded.

To initiate the transfer, the transfer controller 206 may trigger the door of the primary vault 106, and in some cases the door of the secondary vault 108, to unlock using the vault lock system 204, and the user may be prompted to open the doors. It will be appreciated that in some cases, the primary vault 106 will be unlocked and the locked container 104 removed prior to the secondary vault 108 being unlocked for the locked container 104 to be placed during the transfer. In other cases, both the primary vault 106 and the secondary vault 108 may be unlocked together in preparation of the transfer. In each case, timing of the various transfer activities associated with the primary vault 106 are recorded using the timer(s) 210. The user may be prompted to move the locked container 104 to the secondary vault 108, and a timing of the various transfer activities associated with the transfer and the secondary vault 108 are recorded using the timer(s) 210. For example, a time at which a first door to the primary vault 106 is unlocked, a time at which the first door is opened, a time at which the locked container 104 detected by the sensors 212-214 as being removed from the primary vault 106, a time at which a second door to the secondary vault 108 is unlocked, a time at which the second door is open, a time at which the locked container 104 is detected by the sensors 212-214 as being positioned in the secondary vault 108, times at which the identification of the locked container 104 is sensed using the identification sensor(s) 212 in connection with the transfer, a time at which the second door is locked, and times associated with the capture of other physical characteristics, such as weight of the locked container 104, or transfer characteristics may be recorded.

Generally, the compliance controller 208 validates the transfer to determine if the transfer is compliant, and in some cases a level of compliance for the complaint transfer is determined to inform whether to award or maintain an award of provisional credit. On the other hand, a compliance level may be similarly predetermined that the transfer must meet to be a complaint transfer.

In one implementation, compliance of the transfer is determined based on a time delta between when the locked container 104 was removed from the primary vault 106 and placed in the secondary vault 106. Where the time delta falls within a time tolerance band corresponding to a predetermined range of acceptable time values, the timing of the transfer may be designated as compliant. The predetermined range of acceptable time values may be based on a default range that is customizable depending on the physical relationship between the vaults 106-108. The compliance of the transfer may further be based on a difference between corresponding physical characteristics of the locked container 104 as record at the primary vault 106 and at the secondary vault 108, which indicates whether the locked container 104 is the same container following transfer and whether the locked container 104 has been tampered with during transfer. Thus, the compliance of the transfer is generally based on a timing of the transfer, an identity of a user conducting or overseeing the transfer, a chain of custody of the locked container 104 during the transfer, and a physical condition of the locked container 104.

In one implementation, the levels of compliance provides a range of complaint transfers to account for various conditions, particularly in connection with an award of provisional credit. For example, the levels of compliance may include a strict level of compliance, a base level of compliance, and a tolerance level of compliance. The strict level of compliance may involve all designated transfer characteristics and physical characteristics being within corresponding time tolerance bands and physical tolerance bands at the beginning and the end of a transfer. If the characteristics remain with the corresponding tolerance bands following the transfer, the transfer is designated as strictly complaint, and provisional credit may be maintained or awarded. If the compliance level is designated as strictly compliant, and one or more of the characteristics are outside the corresponding tolerance bands, the transfer may be designated as non-compliant or it may be designated as a lower compliance level. In such instances, provisional credit may be denied or revoked, and a special courier visit may be prompted.

The base level of compliance may allow some tolerances to the strictly complaint level of compliance. More particularly, the base level of compliance may involve a base set of physical characteristics and/or transfer characteristics that must fall within corresponding tolerance bands for the transfer to be compliant, while other physical characteristics and/or transfer characteristics outside of the base set may be outside of the corresponding tolerance bands. For example, if the base set includes a two characteristics, then the transfer is complaint where those two characteristics are within the corresponding tolerance bands. In this case, even though the transfer is designated as complaint, provisional credit may not be awarded or maintained, but a special pickup may not be prompted. If more than two characteristics are outside of the corresponding tolerance bands, the transfer may be designated as non-compliant and/or a special courier visit may be prompted. The base set of characteristics may be configurable. In the tolerance level of compliance, certain characteristics, such as transfer time and container identification, must be met for the transfer to be compliant, but other characteristics may be outside the tolerance bands, with provisional credit being determined based on the totality of the characteristics as compared to the tolerance bands.

Compliance data may be stored locally for subsequent extraction and processing by a provisional credit provider, such as a financial institution or cash-in-transit operator, to determine provisional credit, with the cash management controller 102 maintaining an ongoing connection following a success or failure of a transfer. An active TCP/IP connection to the provisional credit provider may be maintained, such that a transfer cannot be initiated in the absence of the connection. The connection may be used to detect power failures or software crashes, either accidentally or deliberately caused.

In one example implementation, the locked container 104 includes an RFID that is attached to, integrated with, or otherwise associated with the locked container 104. The identification sensor(s) 212 may include an RFID reader disposed in the primary vault 106, which can function within a metal enclosure, for example, and can differentiate between two RFID tags. In one example, there is an RFID tag attached to a fob, and the fob is connected to the inside of the primary vault 106 with a flexible connector.

Initially, a proper functionality of the primary vault 106 is confirmed. For example, a user may select an option to start a transfer, and the cash management controller 102 activates a solenoid of the vault lock system 204 to unlock the primary vault 106. The user opens a door to the primary vault 106 and the solenoid of the vault lock system 204 deactivates. The cash management controller 102 verifies a proper transition of the vault door sensors, with failure aborting the process. The cash management controller 102 prompts the user to remove the fob, such that the cash management controller 102 no longer obtains a reading corresponding to the RFID fob. The cash management controller 102 prompts the user to replace the fob and detects when the fob is returned to the primary vault 106, with failure aborting the process. At this point, the cash management controller 102 validates the functionality of the primary vault 106.

Following validation of the functionality of the primary vault 106, in one implementation, the cash management controller 102 initiates and controls sealing operations for sealing a container in the primary vault 106 to become the locked container 104. After sealing or otherwise securing the funds in the locked container 104, the locked container 104 may be transferred to the secondary vault 108.

In one implementation, the cash management controller 102 activates the solenoid of the vault lock system 204 to unlock the primary vault 106 and prompts the user to remove the locked container 104. Once the user opens the door to the primary vault 106, the solenoid of the vault lock system 204 deactivates and the locked container 104 is removed. The cash management controller 102 prompts the user to place the locked container 104 into the secondary vault 108, and the RFID reader in the secondary vault 108 perceives the RFID tag of the locked container 104. The cash management controller 102 prompts the user to close the secondary vault 108 and to insert a new container into the primary vault 106. The user is then prompted to close the primary vault 106, completing the transfer. In some cases, the transfer may be considered to be compromised if the RFID is not read within a configurable time limit, which is set sufficiently short to dissuade theft or tampering through replacement, RFID swapping, cutting and resealing the locked container 104, among other nefarious activities. It will be appreciated that this example implementation may include various modifications or additions, such as an RFID reader within the primary vault 106 and the pre-scanning of the RFID of the locked container using the RFID reader of the primary vault 106.

In another example implementation, the primary vault 106 includes a shallow pan onto which the locked container 104 will be placed. The pan rests upon one or more weight sensors of the other sensors 214 that can perceive a weight of the pan and the locked container 104. Similarly, the other sensors 214 may include a weight sensor that can perceive the growing weight of the locked container 104 while in the primary vault 106. The weight of the locked container 104 is sensed using the other sensors 214 at the primary vault 106 and the secondary vault 108 to determine whether there were any changes to the locked container 104 during the transfer. This implementation does not necessarily depend upon identical weights within both vaults 106-108 for the locked container 104. The measurements are intended to serve as a physical characteristic in connection with different compliance levels and provide forensics data in case of discrepancy. Optionally, an object of known weight can be provided to calibrate the weight sensors by either courier or manager, depending upon the presence of funds in a given vault. Ideally, the object may be the storage vault pan.

Again, a proper functionality of the primary vault 106 is confirmed. For example, a user may select an option to start a transfer, and the cash management controller 102 activates a solenoid of the vault lock system 204 to unlock the primary vault 106. The user opens a door to the primary vault 106 and the solenoid of the vault lock system 204 deactivates. The cash management controller 102 verifies a proper transition of the vault door sensors, with failure aborting the process. The cash management controller 102 prompts the user to lift the pan from the sensors and then replace the pan, with the cash management controller 102 verifying that the weight sensors of the other sensors 214 toggle to a lesser weight, such as zero, and back to the previous weight associated with the pan, with failure again aborting the process. At this point, the cash management controller 102 validates the functionality of the primary vault 106.

Following validation of the functionality of the primary vault 106, in one implementation, the cash management controller 102 initiates and controls sealing operations for sealing a container in the primary vault 106 to become the locked container 104. After sealing or otherwise securing the funds in the locked container 104, the locked container 104 may be transferred to the secondary vault 108.

In one implementation, the cash management controller 102 activates the solenoid of the vault lock system 204 to unlock the primary vault 106 and prompts the user to remove the locked container 104. Once the user opens the door to the primary vault 106, the solenoid of the vault lock system 204 deactivates and the locked container 104 is removed. The cash management controller 102 prompts the user to place the locked container in the secondary vault 108, and the weight sensors of the other sensors 214 in the secondary vault 108 verify that the locked container 104 has been transferred and weighs the same within a weight tolerance band, which may be a configurable delta. The cash management controller 102 prompts the user to close the secondary vault 108 and to insert a new container into the primary vault 106. The user is then prompted to close the primary vault 106, completing the transfer. In some cases, the transfer is considered to be compromised if the pan weight of the secondary vault 108 does not change to an acceptable level within a configurable time limit, which is set sufficiently short to dissuade the theft either through replacement or cutting and resealing the locked container 104, among other nefarious activities.

In some cases, the locked container 104 may be transferred from the primary vault 106 to the secondary vault 108 in another location in connection with a transfer or otherwise. For example, the locked container 104 may be transferred to another area in a facility via a transfer shoot, such as a pressurized tubing system that transports items from one location to another location via suction, pressure, and/or the like. The transport may be initiated manually (e.g., a user inserting the locked container 104 into the transfer shoot) or automatically using a mechanism that automatically grabs, moves, and releases the locked container 104 into the transfer shoot. Upon arriving at the second area via the transfer shoot, the locked container 104 may be manually or automatically placed into the secondary vault 108. The transfer in this manner may be validated using the systems and methods discussed herein.

In one implementation, rather than physically transferring the locked container 104 from the primary vault 106 to the secondary vault 108 in connection with a transfer and validation for provisional credit, the transfer involves a transfer of the validating hardware from the primary vault 106 to the secondary vault 108. More particularly, upon a triggering event, such as a determination that the primary vault 106 is at the capacity threshold, the validating hardware and control are automatically or manually moved from the primary vault 106 to the secondary vault 108. In one implementation, an authenticated user may be directed through a series of prompts to transfer the validating hardware. It will be appreciated that these various example implementations described herein are exemplary only and not intended to be limiting.

Figure 3:
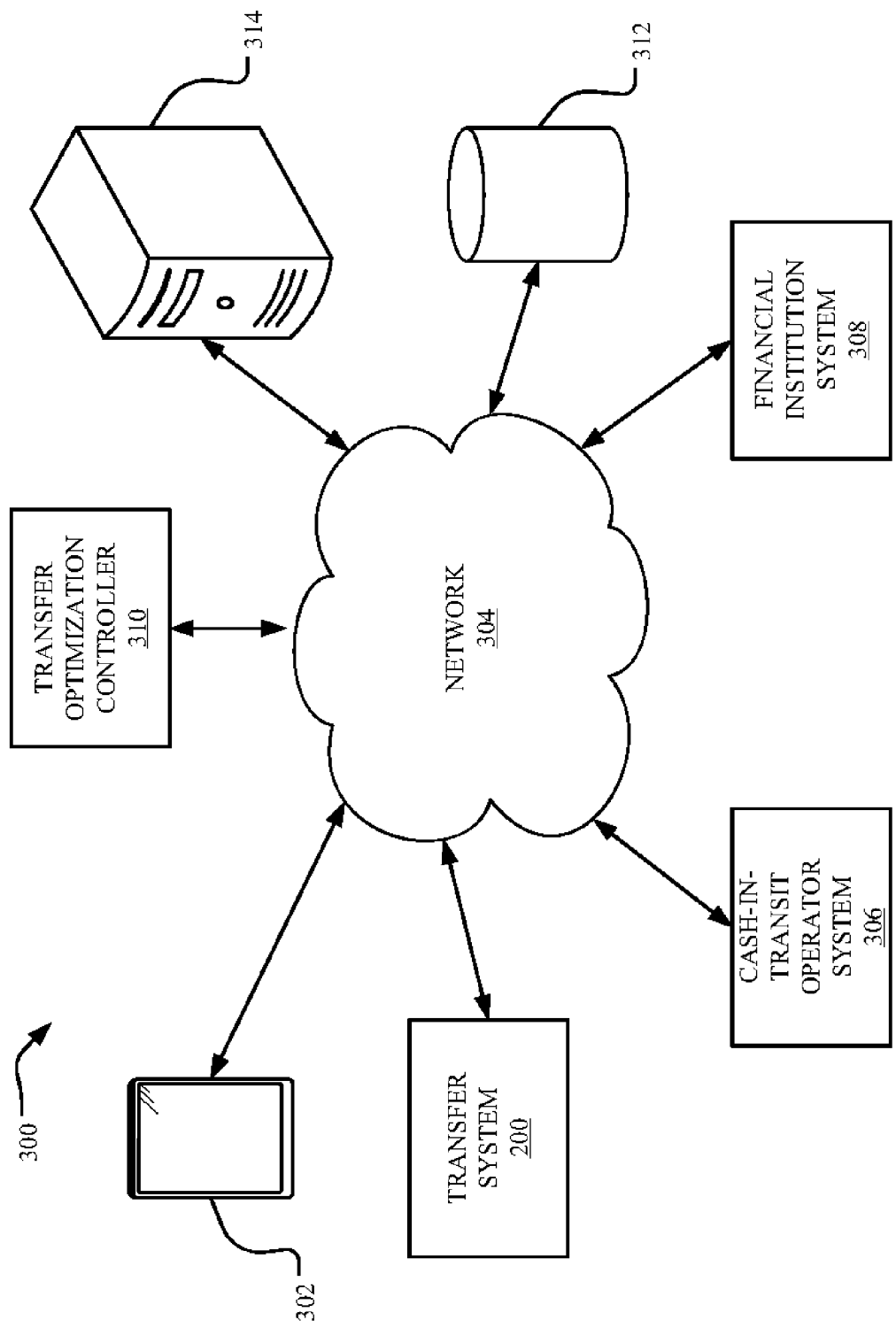
FIG. 3 illustrates an example network environment for implementing various aspects of the presently disclosed technology.

Turning to FIG. 3, an example network environment 300 for cash management is shown. In one implementation, a user accesses and interacts with various aspects of the environment 300 using a user device 302 to access, operate, and/or control aspects of the transfer system 200 within the environment 100 and/or other information or services via a network 304.

The user device 302 is generally any form of computing device capable of interacting with the network 304 and the transfer system 200, such as a personal computer, terminal, workstation, desktop computer, portable computer, mobile device, smartphone, tablet, multimedia console, and/or the like. In some cases the user device 302 integrated into another device, such as the cash management controller 102 to provide the user with an interface (e.g., a touchscreen or other input/output devices deployed with the primary vault 106) for direct interaction, including the prompts and presentation of options discussed herein. The cash management controller 102 may similarly be integrated with the primary vault 106, with the secondary vault 108 and any other devices of the transfer system 200 in communication with the cash management controller 102 via wired or wireless connection (e.g., over the network 304, Bluetooth®, etc.) The user device 302 may alternatively or additionally be a mobile device, such as a tablet, that interacts with the cash management controller 102 that is deployed in each vault 106-108. It will be appreciated that multiple user devices 302 may be deployed in the network environment 300 that communicate over the network 304 to access, operate, maintain, control, or otherwise interact with one or more connected transfer management systems 200, as well as other information, systems, or services, such as a cash-in-transit operator system 306, a financial institution system 308, a transfer optimization controller 310, and/or the like. The user devices 302 may similarly be utilized by users associated with the cash-in-transit operator system 306 (e.g., couriers), the financial institution system 308, and the transfer optimization controller 310.

The network 304 is used by one or more computing or data storage devices (e.g., one or more databases 312 or other computing units described herein) for implementing the various aspects of the transfer system 200, the cash-in-transit operator system 306, the financial institution system 310, the fund optimization controller 312, and other services, applications, or modules in the network environment 300. The user profiles, transaction reports, permission levels, physical characteristics, transfer characteristics, compliance information, software, and other information utilized by the transfer system 200 or other aspects of the network environment 300 may be stored in and accessed from the one or more databases 312. In some implementations, some data is stored locally and may be transmitted to other systems or services of the network environment 300 over the network for use or storage in the one or more databases 312.

In one implementation, the network environment 300 includes at least one server 314 hosting a website or an application that the user may visit to access the transfer system 200 and/or other network components of the network environment 300. The server 314 may be a single server, a plurality of servers with each such server being a physical server or a virtual machine, or a collection of both physical servers and virtual machines. In another implementation, a cloud hosts one or more components of the network environment. The user devices 302, the server 314, and other resources connected to the network 304 may access one or more other servers to access to one or more websites, applications, web services interfaces, storage devices, computing devices, or the like that are used for transfer management, compliance validation, provisional credit management, fund management, and related services. The server 314 may also host a search engine that the transfer system 200 uses for accessing, searching for, and modifying user profiles, permission levels, transfer data, underlying data, and other data, as well as for transfer management services, as described herein.

In one example, upon granting access to the transfer system 200, options within the permission levels for a particular user that are specified in the user profile are presented, including options for initiating a transfer between the vaults 106-108, where permitted. All transactions completed are stored in association with the user profile in local memory or in the one or more databases 312. In one implementation, the transaction reports are transmitted to the cash-in-transit operator system 306, the financial institution system 308, and/or the fund optimization controller 310 over the network 302 or via a wired connection for reconciliation and/or provisional credit. In some instances, transaction reports are also provided to the user following completion of a transaction, such as a transfer.

Based on the transaction reports, the fund optimization controller 310, which may be remote from or integrated with the cash management controller 102, generates analytics, such as: training analytics for training users regarding compliant transfers; evaluation analytics for determine compliance metrics for a user, set of users, or an organization; threat assessment analytics for determining a vulnerability of a vault, transfer process, or organization due to a tangible or intangible threat. Based on the analytics, aspects of transfer management may be predicted or optimized. For example, if analytics indicate that a particular user is regularly outside of a tolerance band for characteristics that are flexible rather than strict but within a security threshold so as not to trigger an alarm, appropriate action, such as training, mitigation, or permission reduction, may be taken.

The security threshold may be used to generate an alert, where a characteristic of a transfer is far enough outside a corresponding tolerance band that additional scrutiny is prompted. For example, if a value of physical and/or transfer characteristics is outside a tolerance band but within the security threshold, provisional credit may not be available, but an alarm may not be triggered. However, if the security threshold is exceeded, an alert in the form of a communication to authorities (e.g., police or security personnel), a manager, an owner, the cash-in-transit operator system 306, the financial institution system 308, and/or to other personnel via the user devices 302 may be generated and transmitted. In addition to a communication, the alert may include an audible alarm output at the location of the vaults 106-108.

Where a transfer is complaint or non-compliant, the cash-in-transit operator system 306 schedules routine or special courier visits, as needed. Because the locked container 104 designated for pickup by the courier may be located in the primary vault 106 or one of what could be a plurality of the secondary vaults 108, the cash management controller 102 may generate a guide to direct the courier to the appropriate vault holding the locked container 104 for pickup. The courier may be guided via indictors, lighting, audible instructions, instructions presented via an interface, and/or the like using the primary vault 106 and/or the user device 202. More particularly, when a user is authenticated with a permission level of a courier, the cash management controller 102 may prompt the courier to access particular volumes in the vaults 106-108 for pickup, as well as trigger the unlocking of the relevant vaults 106-108 using the vault locking system 204. The cash management controller 102 would sense when the locked container 104 is removed from the secondary vault 108 (or the primary vault 106 if not transferred) and that a courier was logged in during the removal activity. A report summarizing data underlying this activity may be stored locally, communication over the network 304, and/or provided to the courier via a receipt.

Figure 4:
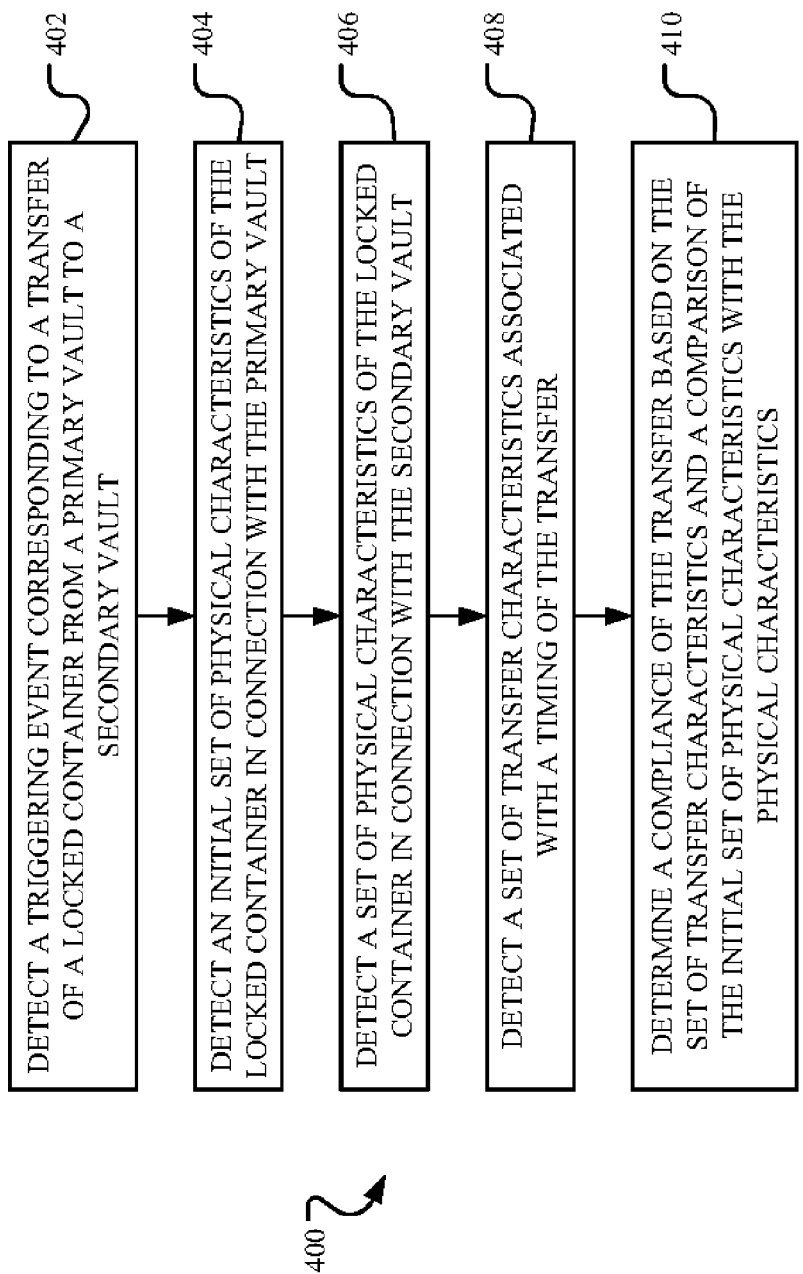
FIG. 4 illustrates example operations for securely transferring a locked container from a primary vault to a secondary vault.

Turning to FIG. 4, example operations 400 for a secure transfer of a locked container are illustrated. In one implementation, an operation 402 detects a triggering event corresponding to a transfer of the locked container from the primary vault to the secondary vault. The secondary vault may be selected from a plurality of secondary vaults based on an availability of space for the locked container. The locked container may be a bag, a cassette, a box containing funds, and/or the like.

In one implementation, the triggering event includes receiving a transfer request from a user; detecting that a container in the primary vault is filled to a capacity threshold, with the container being sealed to become the locked container; and/or the like. The user may be authenticated in connection with the transfer request, for example, by confirming an identity of the user and a permission level of the user. In one implementation, an availability of space for the locked container in the second volume of the secondary vault may be detected. Further, each of the primary vault and the secondary vault may be triggered to unlock in connection with the transfer.

An operation 404 detects a set of initial physical characteristics of the locked container in connection with a first volume of the primary vault. The set of initial physical characteristics is captured using a sensor system. An operation 406 detects a set of physical characteristics of the locked container in connection with a second volume of the secondary vault. The set of physical characteristics captured using the sensor system. The sensor system may include a first set of one or more sensors associated with the primary vault and a second set of one or more sensors associated with the secondary vault. In one implementation, the set of initial physical characteristics includes an initial weight, an initial identification, an initial color, an initial size, an initial shape, an initial mass, and/or the like, and the set of physical characteristics includes a weight, an identification, a color, a size, a shape, a mass, and/or the like. An operation 408 detects a set of transfer characteristics associated with a timing of the transfer from the primary vault to the secondary vault.

An operation 410 determines a compliance of the transfer based on the set of transfer characteristics and a comparison of the set of physical characteristics with the initial physical characteristics. The comparison may be based on a difference between corresponding physical values of the set of initial physical characteristics and the set of physical characteristics being compared with a tolerance band. The compliance of the transfer may be determined based on the difference between corresponding physical values being within the tolerance band for a base number characteristics for the set of initial physical characteristics. In one implementation, the base number of characteristics includes an entirety of the set of initial physical characteristics. The compliance of the transfer may be further determined based on the timing of the transfer being within a time tolerance band. In one implementation, an alert is generated when the difference between corresponding physical values is outside the tolerance band and exceeds a physical security threshold and/or the timing of the transfer is outside the time tolerance band and exceeds a time security threshold.

The compliance of the transfer may be communicated to a financial institution for provisional credit evaluation in connection with the locked container. Further, analytics may be generated based on the transfer, the analytics including training analytics, evaluation analytics, and/or threat assessment analytics.

Figure 5:
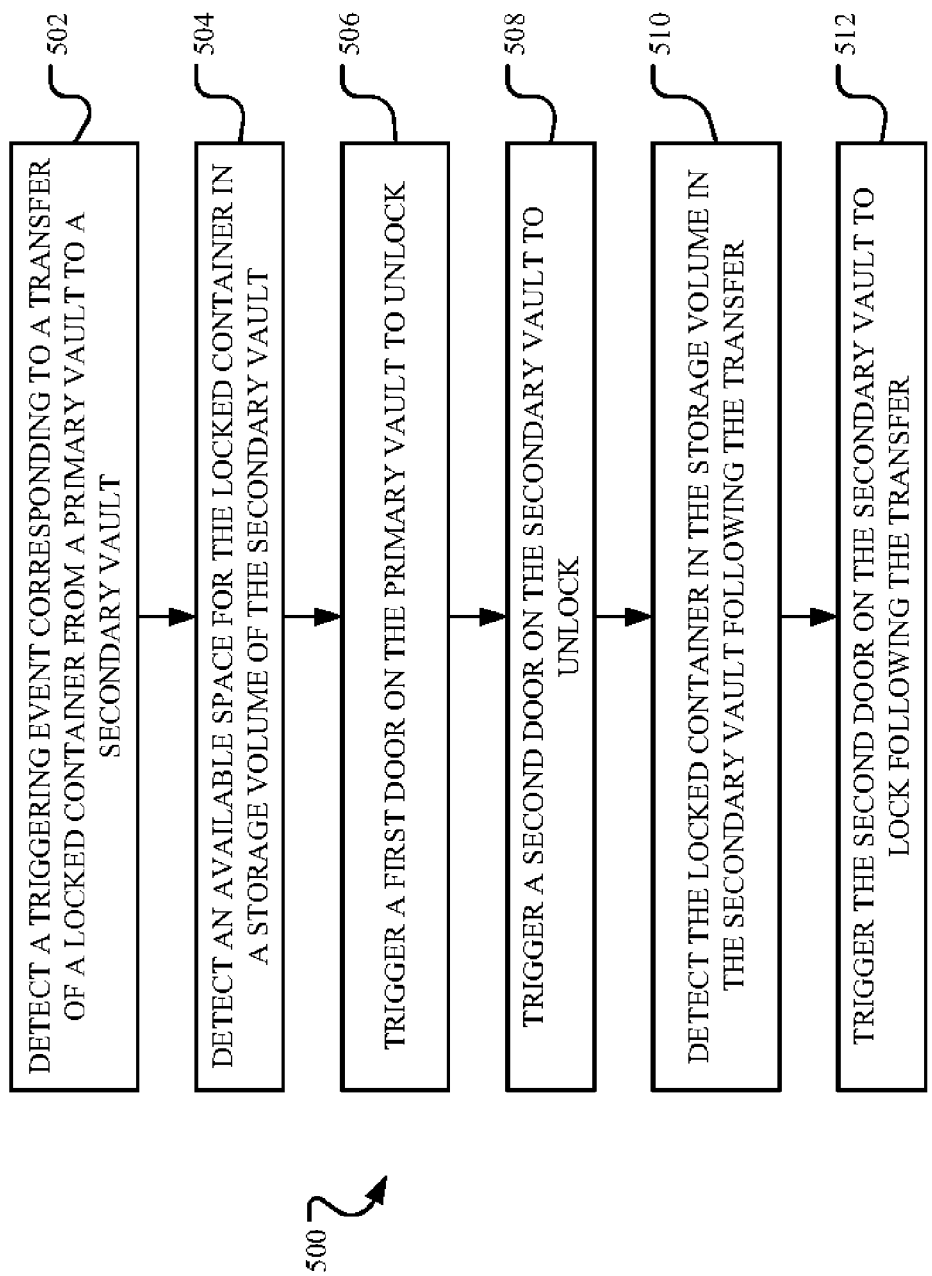
FIG. 5 illustrates example operations for a locked container transfer.

Turning to FIG. 5, example operations 500 for a locked container transfer are shown. In one implementation, an operation 502 detects a triggering event corresponding to a transfer of the locked container from the primary vault to the secondary vault. An operation 504 detects an available space for the locked container in a storage volume of the secondary vault. An operation 506 triggers a first door on the primary vault to unlock, and an operation 508 triggers a second door on the secondary vault to unlock. The first door and the second door may unlocked together or sequentially. An operation 510 detects the locked container in the storage volume in the secondary vault following the transfer, and an operation 512 triggers the second door on the secondary vault to lock following the transfer of the locked container from the primary vault to the secondary vault.

Figure 6:
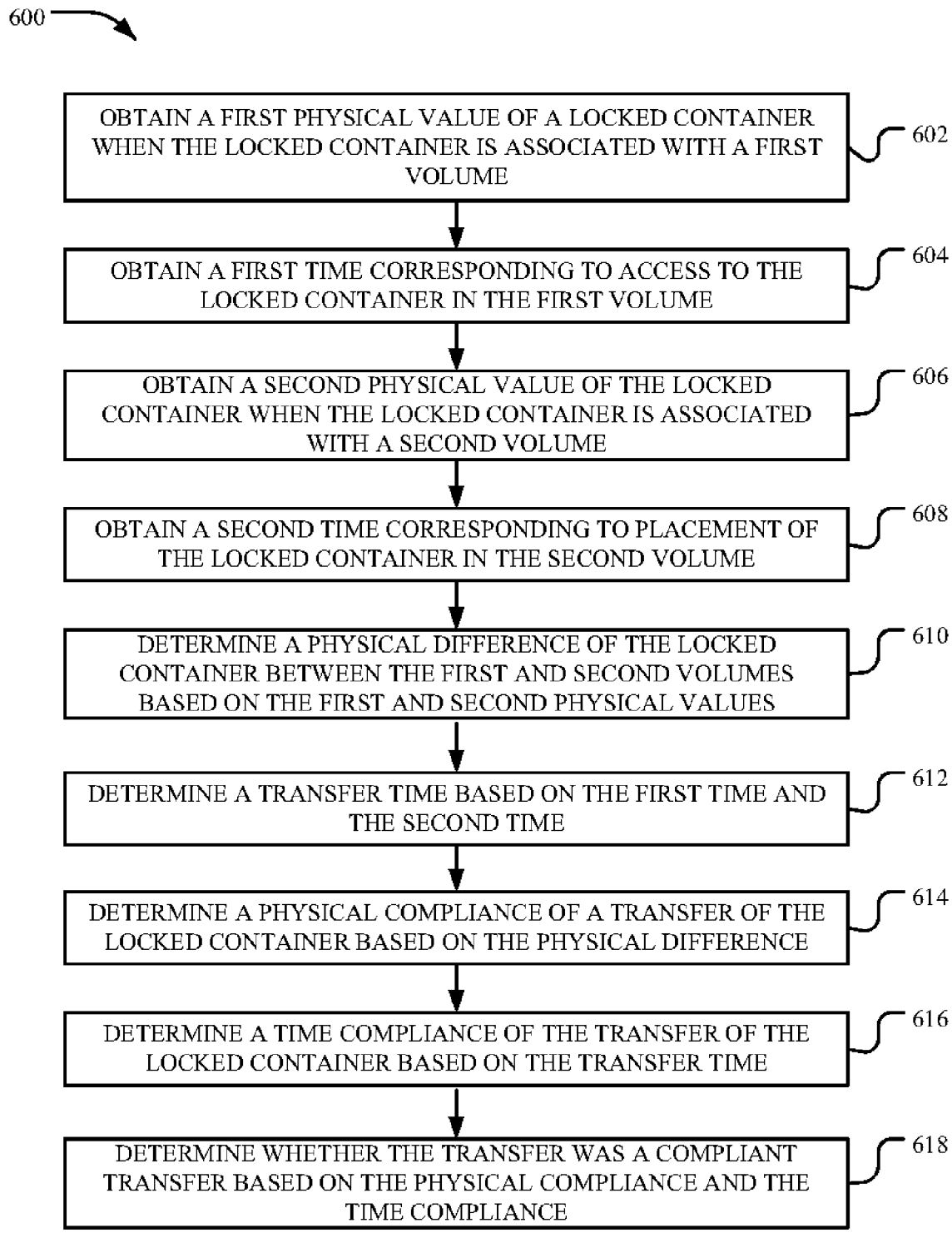
FIG. 6 illustrates example operations for validating a locked container transfer.

FIG. 6 illustrates example operations 600 for validating a locked container transfer. In one implementation, an operation 602 obtains a first physical value of a locked container when the locked container is associated with a first volume of a first vault, and an operation 604 obtains a first time corresponding to access to the locked container in the first volume of the first vault. An operation 606 obtains a second physical value of the locked container when the locked container is associated with a second volume of a second vault, and an operation 608 obtains a second time corresponding to a placement of the locked container in the second volume of the second vault. The first physical value and the second physical value may each include weight, mass, color, identification, size, shape, and/or the like. In one implementation, the locked container is associated with the first volume of the first vault when the locked container is located within the first volume and/or being removed from the first volume. Moreover, the first time may be when a door providing access to the first volume is unlocked and/or when the locked container is removed from the first volume. The second time may similarly be when the locked container is placed in the second volume and/or a door providing access to the second volume is locked following the placement of the locked container. The locked container may be associated with the second volume of the second vault when the locked container is located within the second volume and/or being placed in the second volume.

An operation 610 determines a physical difference of the locked container between the first volume and the second volume based on the first physical value and the second physical value, and an operation 612 determines a transfer time based on the first time and the second time. An operation 614 determines a physical compliance of a transfer of the locked container from the first vault to the second vault based on the physical difference, and an operation 616 determines a time compliance of the transfer of the locked container from the first vault to the second vault based on the transfer time. The physical compliance of the transfer of the locked container from the first vault to the second vault may be determined based on a first comparison of the physical difference with a physical tolerance band, and the time compliance of the transfer may be determined based on a second comparison of the transfer time with a time tolerance band. An operation 618 determines whether the transfer of the locked container from the first vault to the second vault was a compliant transfer based on the physical compliance and the time compliance.

Figure 7:
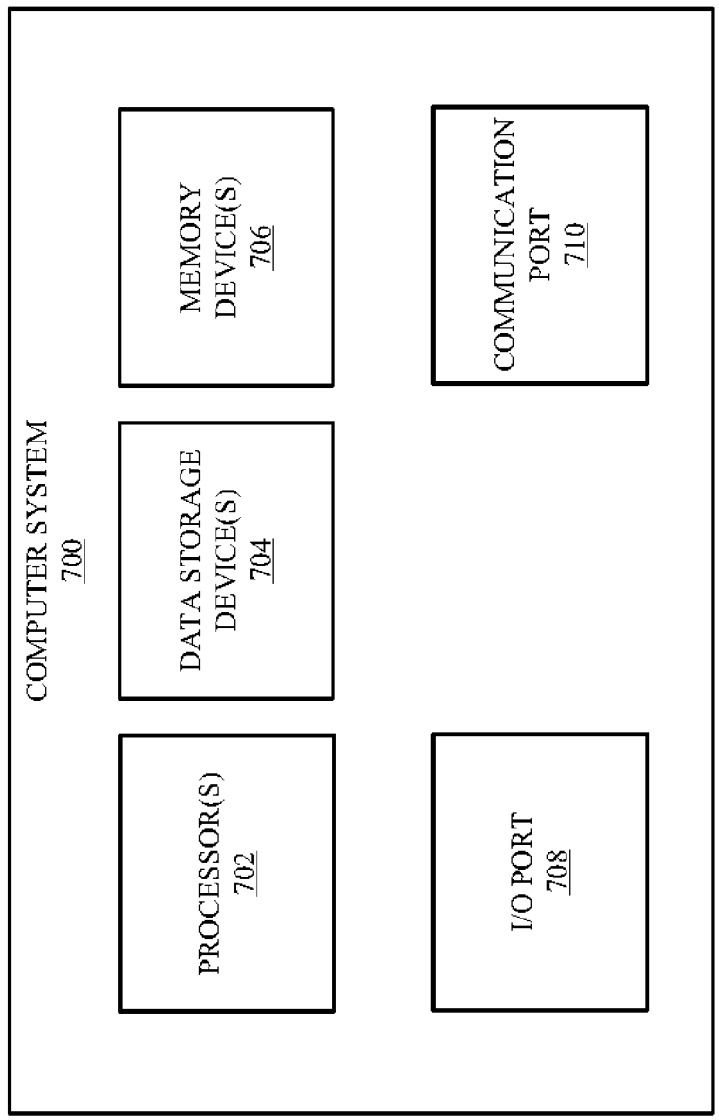
FIG. 7 is an example computing system that may implement various systems and methods discussed herein.

Referring to FIG. 7, a detailed description of an example computing system 700 having one or more computing units that may implement various systems and methods discussed herein is provided. The computing system 700 may be applicable to the primary vault 106, the secondary vault 108, the cash management controller 102, the user devices 302, and other computing or network devices of the system 200 and the environments 100 and 300. It will be appreciated that specific implementations of these devices may be of differing possible specific computing architectures not all of which are specifically discussed herein but will be understood by those of ordinary skill in the art.

The computer system 700 may be a computing system is capable of executing a computer program product to execute a computer process. Data and program files may be input to the computer system 700, which reads the files and executes the programs therein. Some of the elements of the computer system 700 are shown in FIG. 7, including one or more hardware processors 702, one or more data storage devices 704, one or more memory devices 708, and/or one or more ports 708-710. Additionally, other elements that will be recognized by those skilled in the art may be included in the computing system 700 but are not explicitly depicted in FIG. 7 or discussed further herein. Various elements of the computer system 700 may communicate with one another by way of one or more communication buses, point-to-point communication paths, or other communication means not explicitly depicted in FIG. 7.

The processor 702 may include, for example, a central processing unit (CPU), a graphics processing unit (GPU), a microprocessor, a microcontroller, a digital signal processor (DSP), and/or one or more internal levels of cache. There may be one or more processors 702, such that the processor 702 comprises a single central-processing unit, or a plurality of processing units capable of executing instructions and performing operations in parallel with each other, commonly referred to as a parallel processing environment.

The computer system 700 may be a conventional computer, a distributed computer, or any other type of computer, such as one or more external computers made available via a cloud computing architecture. The presently described technology is optionally implemented in software stored on the data stored device(s) 704, stored on the memory device(s) 706, and/or communicated via one or more of the ports 708-710, thereby transforming the computer system 700 in FIG. 7 to a special purpose machine for implementing the operations described herein. Examples of the computer system 700 include personal computers, terminals, workstations, mobile phones, tablets, laptops, personal computers, multimedia consoles, gaming consoles, set top boxes, and the like.

The one or more data storage devices 704 may include any non-volatile data storage device capable of storing data generated or employed within the computing system 700, such as computer executable instructions for performing a computer process, which may include instructions of both application programs and an operating system (OS) that manages the various components of the computing system 700. The data storage devices 704 may include, without limitation, magnetic disk drives, optical disk drives, solid state drives (SSDs), flash drives, and the like. The data storage devices 704 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 706 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 704 and/or the memory devices 706, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 700 includes one or more ports, such as an input/output (I/O) port 708 and a communication port 710, for communicating with other computing, network, or vehicle devices. It will be appreciated that the ports 708-710 may be combined or separate and that more or fewer ports may be included in the computer system 700.

The I/O port 708 may be connected to an I/O device, or other device, by which information is input to or output from the computing system 700. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 700 via the I/O port 708. Similarly, the output devices may convert electrical signals received from computing system 700 via the I/O port 708 into signals that may be sensed as output by a human, such as sound, light, and/or touch. The input device may be an alphanumeric input device, including alphanumeric and other keys for communicating information and/or command selections to the processor 702 via the I/O port 708. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 700 via the I/O port 708. For example, an electrical signal generated within the computing system 700 may be converted to another type of signal, and/or vice-versa. In one implementation, the environment transducer devices sense characteristics or aspects of an environment local to or remote from the computing device 700, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 700, such as, physical movement of some object (e.g., a mechanical actuator), heating or cooling of a substance, adding a chemical substance, and/or the like.

In one implementation, a communication port 710 is connected to a network by way of which the computer system 700 may receive network data useful in executing the methods and systems set out herein as well as transmitting information and network configuration changes determined thereby. Stated differently, the communication port 710 connects the computer system 700 to one or more communication interface devices configured to transmit and/or receive information between the computing system 700 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 710 to communicate one or more other machines, either directly over a point-to-point communication path, over a wide area network (WAN) (e.g., the Internet), over a local area network (LAN), over a cellular (e.g., third generation (3G), fourth generation (4G), or fifth generation (5G)) network, or over another communication means. Further, the communication port 710 may communicate with an antenna or other link for electromagnetic signal transmission and/or reception.

In an example implementation, operations for secured transfer of locked containers, compliant transfer validation, provisional fund validation, data, and software and other modules and services may be embodied by instructions stored on the data storage devices 704 and/or the memory devices 706 and executed by the processor 702.

The system set forth in FIG. 7 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for securely transferring a locked container from a primary vault to a secondary vault, the method comprising:
   detecting a triggering event corresponding to a transfer of the locked container from the primary vault to the secondary vault;
   detecting a set of initial physical characteristics of the locked container in connection with a first volume of the primary vault, the set of initial physical characteristics captured using a sensor system;
   detecting a set of physical characteristics of the locked container in connection with a second volume of the secondary vault, the set of physical characteristics captured using the sensor system;
   detecting a set of transfer characteristics associated with a timing of the transfer from the primary vault to the secondary vault; and determining a compliance of the transfer based on the set of transfer characteristics and a comparison of the set of physical characteristics with the initial physical characteristics.

2. The method of claim 1, wherein the sensor system includes a first set of one or more sensors associated with the primary vault and a second set of one or more sensors associated with the secondary vault.

3. The method of claim 1, wherein the set of initial physical characteristics includes at least one of an initial weight, an initial identification, an initial color, an initial size, an initial shape, or an initial mass and the set of physical characteristics includes at least one of a weight, an identification, a color, a size, a shape, or a mass.

4. The method of claim 1, wherein the triggering event includes one or more of receiving a transfer request from a user and detecting that a container in the primary vault is filled to a capacity threshold, the container being sealed to become the locked container.

5. The method of claim 4, wherein the user is authenticated in connection with the transfer request.

6. The method of claim 4, wherein the user is authenticated by confirming an identity of the user and a permission level of the user.

7. The method of claim 1, further comprising:
detecting an availability of space for the locked container in the second volume of the secondary vault.

8. The method of claim 1, further comprising:
triggering each of the primary vault and the secondary vault to unlock in connection with the transfer.

9. The method of claim 1, wherein the comparison is based on a difference between corresponding physical values of the set of initial physical characteristics and the set of physical characteristics being compared with a tolerance band.

10. The method of claim 9, wherein the compliance of the transfer is determined based on the difference between corresponding physical values being within the tolerance band for a base number characteristics for the set of initial physical characteristics.

11. The method of claim 10, wherein the base number of characteristics includes an entirety of the set of initial physical characteristics.

12. The method of claim 9, wherein the compliance of the transfer is further determined based on the timing of the transfer being within a time tolerance band.

13. The method of claim 12, wherein an alert is generated when at least one of the difference between corresponding physical values is outside the tolerance band and exceeds a physical security threshold or the timing of the transfer is outside the time tolerance band and exceeds a time security threshold.

14. The method of claim 1, wherein the compliance of the transfer is communicated to a financial institution for provisional credit evaluation in connection with the locked container.

15. The method of claim 1, wherein analytics are generated based on the transfer, the analytics including one or more training analytics, evaluation analytics, and threat assessment analytics.

16. The method of claim 1, wherein the secondary vault is selected from a plurality of secondary vaults based on an availability of space for the locked container.

17. The method of claim 1, wherein the locked container is at least one of a bag, a cassette, or a box containing funds.

18. One or more non-transitory computer-readable storage media storing computer-executable instructions for performing a computer process on a computing system, the computer process comprising:
obtaining a first physical value of a locked container when the locked container is associated with a first volume of a first vault;
obtaining a first time corresponding to access to the locked container in the first volume of the first vault;
obtaining a second physical value of the locked container when the locked container is associated with a second volume of a second vault;
obtaining a second time corresponding to a placement of the locked container in the second volume of the second vault;
determining a physical difference of the locked container between the first volume and the second volume based on the first physical value and the second physical value;
determining a transfer time based on the first time and the second time;
determining a physical compliance of a transfer of the locked container from the first vault to the second vault based on the physical difference;
determining a time compliance of the transfer of the locked container from the first vault to the second vault based on the transfer time; and
determining whether the transfer of the locked container from the first vault to the second vault was a compliant transfer based on the physical compliance and the time compliance.

19. The one or more non-transitory computer-readable storage media of claim 18, wherein the first physical value and the second physical value each include at least one of weight, mass, color, identification, size, or shape.

20. The one or more non-transitory computer-readable storage media of claim 18, wherein the locked container is associated with the first volume of the first vault when the locked container is at least one of located within the first volume or being removed from the first volume.

21. The one or more non-transitory computer-readable storage media of claim 18, wherein the first time is at least one of when a door providing access to the first volume is unlocked or when the locked container is removed from the first volume.

22. The one or more non-transitory computer-readable storage media of claim 18, wherein the second time is at least one of when the locked container is placed in the second volume or a door providing access to the second volume is locked following the placement of the locked container.

23. The one or more non-transitory computer-readable storage media of claim 18, wherein the locked container is associated with the second volume of the second vault when the locked container is at least one of located within the second volume or being placed in the second volume.

24. The one or more non-transitory computer-readable storage media of claim 18, wherein the physical compliance of the transfer of the locked container from the first vault to the second vault is determined based on a first comparison of the physical difference with a physical tolerance band and the time compliance of the transfer is determined based on a second comparison of the transfer time with a time tolerance band.

25. A method for securely transferring a locked container from a primary vault to a secondary vault, the method comprising:

detecting a triggering event corresponding to a transfer of the locked container from the primary vault to the secondary vault;

detecting an available space for the locked container in a storage volume of the secondary vault;

triggering a first door on the primary vault to unlock;

triggering a second door on the secondary vault to unlock;

detecting the locked container in the storage volume in the secondary vault following the transfer; and triggering the second door on the secondary vault to lock following the transfer of the locked container from the primary vault to the secondary vault.

26. The method of claim 25, wherein the first door and the second door are unlocked together.

27. The method of claim 25, wherein the first door and the second door are unlocked sequentially.

28. A method for a locked container transfer from a primary vault to a secondary vault, the method comprising:

detecting a triggering event corresponding to a transfer of a first locked container from the primary vault to the secondary vault;

detecting the first locked container in the primary vault;

detecting a second locked container in the secondary vault;

determined a transfer time for the transfer based on when the second locked container is detected in the secondary vault; and validating the transfer as a compliant transfer when the second locked container is identified as the first locked container and the transfer time is within a time tolerance band.

29. The method of claim 28, wherein the primary vault is a sealing vault and the secondary vault is a storage vault.

* * * * *